(12) United States Patent
Wang et al.

(10) Patent No.: US 12,508,442 B2
(45) Date of Patent: Dec. 30, 2025

(54) POSITIONING DEVICE FOR RADIOTHERAPY

(71) Applicant: KLARITY MEDICAL & EQUIPMENT(GZ) CO., LTD., Guangdong (CN)

(72) Inventors: Wei Wang, Guangdong (CN); Zhongqun Zhang, Guangdong (CN); Xiaofeng Fu, Guangdong (CN)

(73) Assignee: KLARITY MEDICAL & EQUIPMENT(GZ) CO., LTD., Guangdong (CN)

( * ) Notice: Subject to any disclaimer, the term of this patent is extended or adjusted under 35 U.S.C. 154(b) by 409 days.

(21) Appl. No.: 18/356,231

(22) Filed: Jul. 21, 2023

(65) Prior Publication Data

US 2024/0173566 A1 May 30, 2024

Related U.S. Application Data

(63) Continuation of application No. PCT/CN2022/134359, filed on Nov. 25, 2022.

(51) Int. Cl.
*A61N 5/10* (2006.01)

(52) U.S. Cl.
CPC ........ *A61N 5/10* (2013.01); *A61N 2005/1092* (2013.01)

(58) Field of Classification Search
None
See application file for complete search history.

(56) References Cited

U.S. PATENT DOCUMENTS

| 2019/0290471 A1* | 9/2019 | Nordgren | A61F 5/3707 |
| 2020/0139154 A1* | 5/2020 | Wilson | A61B 90/18 |

(Continued)

FOREIGN PATENT DOCUMENTS

| CN | 202724482 | 2/2013 |
| CN | 205460496 | 8/2016 |

(Continued)

OTHER PUBLICATIONS

"International Search Report (Form PCT/ISA/210) of PCT/CN2022/134359," mailed on Mar. 8, 2023, with English translation thereof, pp. 1-3.

*Primary Examiner* — Hoon K Song
(74) *Attorney, Agent, or Firm* — JCIPRNET

(57) ABSTRACT

A positioning device for radiotherapy, includes a first frame, a degradable low-temperature thermoplastic film and a degradable second frame. The second frame is connected to an outer edge of the low-temperature thermoplastic film, and a softening point of the second frame is higher than a softening point of the low-temperature thermoplastic film. A mechanical strength of the first frame is greater than a mechanical strength of the second frame, and the first frame and the second frame are detachably connected through a first connecting structure. When in use, the positioning device for radiotherapy in the disclosure has satisfactory rigidity and mechanical strength for positioning, and effectively avoids waste and environmental pollution since the second frame and the low-temperature thermoplastic film that are non-reusable are degradable and the non-degradable first frame is reusable.

30 Claims, 9 Drawing Sheets

(56) References Cited

U.S. PATENT DOCUMENTS

2021/0069526 A1\* 3/2021 Howerzyl .............. A61B 90/10
2022/0080224 A1   3/2022 Chen
2022/0370827 A1\* 11/2022 De Mooij ............ A61N 5/1049

FOREIGN PATENT DOCUMENTS

| CN | 213131643 | 5/2021 |
| CN | 213220586 | 5/2021 |
| CN | 217139007 | 8/2022 |

\* cited by examiner

POSITIONING DEVICE FOR RADIOTHERAPY

CROSS-REFERENCE TO RELATED APPLICATION

This application is a continuation of international PCT application serial no. PCT/CN2022/134359, filed on Nov. 25, 2022. The entirety of the above mentioned patent application is hereby incorporated by reference herein and made a part of this specification.

TECHNICAL FIELD

The disclosure relates to the technical field of medical appliances, and more particular relates to a positioning device for radiotherapy.

BACKGROUND

Radiotherapy, as an important means in the treatment of malignant tumors, is effective for many cancers. While killing tumor cells, radiation will inevitably damage normal tissues or organs. In order to effectively kill tumor cells and minimize damage to normal tissues and organs, positioning devices are needed to fix the patient's body position during radiotherapy to ensure the accuracy of the patient's body position during each treatment and the precision during repeated posing. The positioning device needs to be customized to the patient, i.e., each patient needs to use a positioning device customized to his own body shape during radiotherapy.

At present, the positioning device for radiotherapy includes a low-temperature thermoplastic film, a plastic frame and a connecting piece. In order to ensure the stability of fixation of the low-temperature thermoplastic film, the low-temperature thermoplastic film and the plastic frame are typically connected into a whole by welding or bonding, and the connecting piece fixes the plastic frame to the radiotherapy baseplate. When in use, after the heated low-temperature thermoplastic film is shaped into the outline of human body to wrap different body parts, the plastic frame is fixed to the radiotherapy baseplate through the connecting piece. Particularly, the plastic frame requires good rigidity and toughness to ensure the accuracy of radiotherapy positioning, but the existing degradable materials cannot meet the requirements of the plastic frame for rigidity and mechanical strength. The low-temperature thermoplastic film is generally made of polycaprolactone, which is a degradable material. The plastic frame and the low-temperature thermoplastic film are sold and used as a whole product, and become waste as a whole after use.

The large population of cancer cases and the high consumption of positioning devices for radiotherapy have led to an increase in the consumption of plastic frames, which are not degradable and thus lead to environmental pollution. Based on the above, if the plastic frame is also made of a degradable material, the plastic frame made of the degradable material will have unsatisfactory rigidity and mechanical strength. If the frame is made of engineering plastic with satisfactory rigidity and mechanical strength, the non-degradable engineering plastic frame will cause environmental pollution.

SUMMARY

In order to overcome the defects in the prior art, the disclosure provides a frame for radiotherapy, which can have satisfactory rigidity and mechanical strength for positioning when in use, and can effectively avoid waste and environmental pollution since the second frame and the low-temperature thermoplastic film that are non-reusable are degradable while the non-degradable first frame is reusable.

In order to solve the above technical problem, the disclosure adopts the following technical solution:

Provided is a positioning device for radiotherapy, including a first frame, a degradable low-temperature thermoplastic film and a degradable second frame. The second frame is connected to an outer edge of the low-temperature thermoplastic film, and a softening point of the second frame is higher than a softening point of the low-temperature thermoplastic film. A mechanical strength of the first frame is greater than a mechanical strength of the second frame, and the first frame and the second frame are detachably connected through a first connecting structure.

According the positioning device for radiotherapy in the disclosure, the second frame and the low-temperature thermoplastic film form a degradable whole, the first frame is non-degradable, and the first frame and the second frame are detachably connected. When in use, the first frame is connected to the second frame. The first frame has good rigidity and mechanical strength, and thus, can ensure the rigidity and mechanical strength of the overall positioning device for radiotherapy, thereby ensuring the accuracy of positioning of the positioning device for radiotherapy patients. After the positioning device for radiotherapy has been used by the radiotherapy patient, the first frame is detached from the second frame. The first frame is reusable, and the second frame and the low-temperature thermoplastic film are non-reusable but degradable, which thereby avoids environmental pollution. When in use, the positioning device for radiotherapy in the disclosure can have satisfactory rigidity and mechanical strength for positioning, and can effectively avoid waste and environmental pollution since the second frame and the low-temperature thermoplastic film that are non-reusable are degradable while the non-degradable first frame is reusable.

Further, the first connecting structure includes a first snap-fit portion arranged at the first frame and a second snap-fit portion arranged at the second frame. The first snap-fit portion is connected to the second snap-fit portion.

Further, the first snap-fit portion is a snap-fit member rotatably mounted at the first frame, and the snap-fit member is provided with a first snap-fit groove into which the first frame and the second frame snap.

Further, the second snap-fit portion is a first recess provided in the second frame, and a bottom edge of the snap-fit member snaps into the first recess.

Further, when the bottom edge of the snap-fit member snaps into the first recess, a bottom surface of the snap-fit member is flush with a bottom surface of the second frame.

Further, the first snap-fit portion is a barb formed by turning down the first frame to the second frame, and the barb is provided with a second snap-fit groove into which the second frame snaps.

Further, the second snap-fit portion is a second recess provided in the second frame, and a bottom edge of the barb snaps into the second recess.

Further, when the bottom edge of the barb snaps into the second recess, a bottom surface of the barb is flush with a bottom surface of the second frame.

Further, the first frame is provided with a plurality of notches, and at least one side of the barb is provided with the notch.

Further, the first snap-fit portion is a third snap-fit groove provided at an inner edge of the first frame and having a shape matched with that of an outer edge of the second frame, and the second frame snaps in along the third snap-fit groove or is inserted into the third snap-fit groove.

Further, the first frame includes a plurality of side strips hinged sequentially, and a junction between the adjacent side strips is provided with a rotary joint.

Further, the first frame is provided with a plurality of flanges turned down to the second frame, the first snap-fit portion is a hollow portion formed by recessing an edge of the first frame between the two adjacent flanges, and the second snap-fit portion is a protrusion arranged at the second frame and fitted with the hollow portion.

Further, when the protrusion is arranged in the hollow portion, a surface of the protrusion is flush with a surface of the first frame, and an edge of the protrusion is flush with edges of the flanges on two sides of the protrusion.

Further, the first snap-fit portion is a plurality of abutting members projecting from a bottom surface of the first frame, and the second snap-fit portion is a plurality of snap-fit holes provided in the second frame. The abutting member snaps into an inner wall of the snap-fit hole.

Further, the first connecting structure includes a first fastening portion arranged at the first frame and a second fastening portion arranged at the second frame. The first fastening portion is fastened to the second fastening portion.

Further, the first fastening portion is fastened to the second fastening portion through a clamping claw, and the clamping claw is provided with a third fastening portion and a fourth fastening portion distributed up and down. The first fastening portion is fastened to the third fastening portion, and the second fastening portion is fastened to the fourth fastening portion.

Further, a bottom surface of the first frame is provided with a plurality of first barb portions, and a top surface of the second frame is provided with a plurality of second barb portions. Positions of the first barb portions are in one-to-one correspondence to positions of the plurality of second barb portions, and the first barb portion is fitted with the second barb portion to realize detachable connection between the first frame and the second frame.

Further, when the first barb portion is fitted with the second barb portion, the bottom surface of the first frame is closely attached to the top surface of the second frame.

Further, a bottom surface of the first frame and/or a top surface of the second frame are/is provided with a reusable adhesive.

Further, a bottom surface of the first frame and/or a top surface of the second frame are/is provided with a plurality of evenly distributed suction cups.

Further, a bottom surface of the first frame and a top surface of the second frame are provided with magnetic members capable of attracting each other.

Further, a bottom surface of the first frame and a top surface of the second frame are provided with hook and loop fasteners capable of being bonded to each other.

Further, the first connecting structure is an insertion latch. The first frame and the second frame are respectively provided with a plurality of connecting holes, and the insertion latch locks the first frame and the second frame when being inserted into the connecting hole.

Further, the insertion latch includes a clamping claw and a lockpin. The clamping claw is mounted in the connecting hole. The lockpin is inserted into an inner side of the clamping claw to outwardly expand the clamping claw, and when the lockpin is inserted into the clamping claw, the clamping claw expands to lock the first frame against the second frame.

Further, the first frame is detachably connected to a radiotherapy baseplate through a second connecting structure.

Further, the second connecting structure is an insertion latch. The first frame and the second frame are respectively provided with a plurality of connecting holes. The radiotherapy baseplate is provided with a plurality of mounting holes. The insertion latch locks the first frame, the second frame and the radiotherapy baseplate when being inserted into the connecting hole.

Further, the insertion latch includes a clamping claw and a lockpin. The clamping claw runs through the connecting hole and is provided with a third expansion claw at a bottom thereof. The lockpin is inserted into an inner side of the clamping claw and provided with a third expansion protrusion. The third expansion protrusion squeezes the third expansion claw to outwardly expand the third expansion claw. The third expansion claw expands and becomes fastened in the mounting hole.

Further, when the first connecting structure and the second connecting structure are both the insertion latches, the first connecting structure and the second connecting structure form one combined insertion latch having a first locking position and a second locking position distributed up and down. When the first connecting structure and the second connecting structure are in the first locking position, the first frame and the second frame are locked. When the first connecting structure and the second connecting structure are in the second locking position, the first frame, the second frame and the radiotherapy baseplate are locked.

Further, the combined insertion latch includes a clamping claw and a lockpin. The clamping claw is provided with a first expansion claw and a second expansion claw, and the lockpin is provided with a first expansion protrusion and a second expansion protrusion. When the lockpin is pressed down, the first expansion claw is squeezed by the first expansion protrusion to expand outwardly along a radial direction of the clamping claw so as to fix the first frame and the second frame. When the lockpin is pressed down further, the second expansion claw is squeezed by the second expansion protrusion to expand outwardly along the radial direction of the clamping claw so as to fix the first frame, the second frame and the radiotherapy baseplate.

Further, a bottom of the first frame is provided with a positioning protrusion, a top of the second frame is provided with a positioning depression, and the positioning protrusion is fitted with the positioning depression to realize positioning; or the bottom of the first frame is provided with a positioning depression, the top of the second frame is provided with a positioning protrusion, and the positioning protrusion is fitted with the positioning depression to realize positioning.

Compared with the prior art, the disclosure has the following beneficial effects:

When in use, the positioning device for radiotherapy in the disclosure can have satisfactory rigidity and mechanical strength for positioning, and can effectively avoid waste and environmental pollution since the second frame and the low-temperature thermoplastic film that are non-reusable are degradable and the non-degradable first frame is reusable.

According to the positioning device for radiotherapy in the disclosure, when the low-temperature thermoplastic film and the frame are connected by hot melting, gluing or ultrasonic welding, the stability of connection between the second frame and the low-temperature thermoplastic film which have similar properties is better than that between the first frame and the low-temperature thermoplastic film.

According to the positioning device for radiotherapy in the disclosure, the first connecting structure is used to realize pre-mounting of the first frame and the second frame, which can effectively avoid the loss of parts caused by scattering of parts. The second connecting structure is used to connect the first frame, the second frame and the radiotherapy baseplate, which can effectively ensure the stability of connection between the positioning device and the radiotherapy baseplate.

According to the positioning device for radiotherapy in the disclosure, when the first connecting structure and the second connecting structure form one two-segment pin type insertion latches, the pre-mounting between the first frame and the second frame is realized in the first locking position, and the mounting of the first frame, the second frame and the radiotherapy baseplate is realized in the second locking position, which can simplify the structures of the first connecting structure and the second connecting structure, avoid the loss of parts caused by scattering of parts and effectively ensure the stability of connection between the positioning device and the radiotherapy baseplate.

DETAILED DESCRIPTION OF EMBODIMENTS

Figure 1:
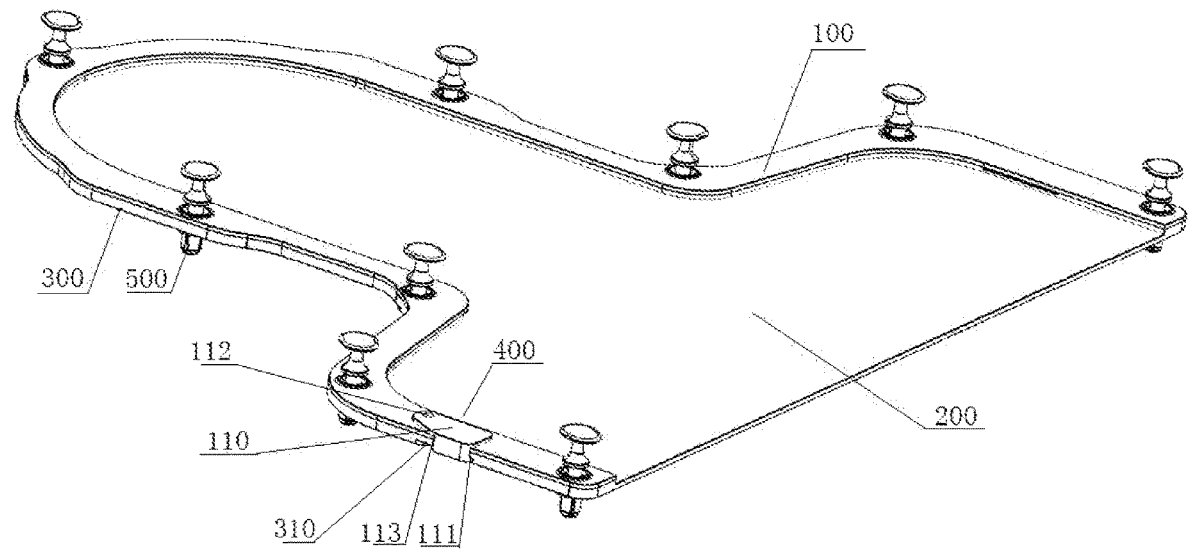
FIG. 1 is a schematic structural view of a positioning device for radiotherapy in Example I and Example II.

The disclosure will be further described in conjunction with specific embodiments. The accompanying drawings are only for illustrative purposes, represent only schematic, not physical drawings, and are not to be construed as limiting the disclosure. In order to better illustrate the examples of the disclosure, some components in the accompanying drawings are omitted, enlarged or reduced, and do not represent the dimensions of the actual product. It can be understood for those skilled in the art that some well-known structures in the accompanying drawings and descriptions thereof may be omitted.

The same or similar reference numerals in the accompanying drawings of the examples of the disclosure correspond to the same or similar parts. In the description of the disclosure, it should be understood that if the orientation or positional relationship indicated by the terms "up", "down", "left" and "right" is based on the orientation or positional relationship shown in the accompanying drawings, it is only for the convenience of describing the disclosure and simplifying the description, and does not indicate or imply that the device or element referred to must have a specific orientation, or be constructed and operated in a specific orientation. Therefore, the terms describing the positional relationship in the accompanying drawings are only used for illustrative purposes, and are not to be construed as limiting the disclosure. For those of ordinary skill in the art, the specific meaning of the above terms may be understood according to specific conditions.

Example I

FIG. 1 shows Example I of a positioning device for radiotherapy according to the disclosure, which includes a first frame 100, a degradable low-temperature thermoplastic film 200 and a degradable second frame 300. The second frame 300 is connected to an outer edge of the low-temperature thermoplastic film 200, and a softening point of the second frame 300 is higher than a softening point of the low-temperature thermoplastic film 200. A mechanical strength of the first frame 100 is greater than a mechanical strength of the second frame 300, and the first frame 100 and the second frame 300 are detachably connected through a first connecting structure 400. In order to facilitate the mounting of the first frame 100 and the second frame 300, the first frame 100 and the second frame 300 may be set to have similar shapes, and the first frame 100 and the second frame 300 may be stacked up and down. Of course, it should be noted that the shapes and placement forms of the first frame 100 and the second frame 300 are not limited to those specified above.

In this example, the low-temperature thermoplastic film 200 may be formed from polycaprolactone (PCL), and the second frame 300 may be formed from PBAT. PBAT, which is a thermoplastic biodegradable plastic, is a copolymer of butanediol adipate and butanediol terephthalate that has the characteristics of PBA and PBT. PBAT has not only good ductility and elongation at break, but also good heat resistance and impact properties. Besides, PBAT also has excellent biodegradability and is one of the best degradable materials in the research of biodegradable plastics and the market application. Of course, the second frame may also be made of other materials that have similar properties to or better properties than PBAT, which is not limited herein. PCL is also a degradable material, but PBAT has better heat resistance than PCL. Specifically, when the low-temperature thermoplastic film 200 is shaped in hot water at 60° C., the PCL can be softened and deformed at this temperature so as to be shaped, and the PBAT can still maintain a certain mechanical strength without deformation at this temperature, thereby ensuring the accuracy of shaping of the low-temperature thermoplastic film 200 and also ensuring the stability of connection between the second frame 300 and the first frame 100. A too large thickness of the second frame 300 will affect the attenuation of rays, and a too small thickness will lead to an insufficient strength of the second frame. Therefore, the thickness of the second frame 300 in this example may be 4 mm-7 mm, preferably 5 mm.

In addition, since this example has a high requirement for the mechanical strength of the first frame 100, the first frame 100 in this example may be made of a high-strength material, such as composite materials made of special engineering plastics, carbon fiber, glass fiber, Kevlar fiber or basalt fiber with epoxy resin or other resins, or other nonmetallic materials that have satisfactory rigidity and toughness for radiotherapy positioning.

In terms of the connection between the first frame 100 and the second frame 300, in this example, a first connecting structure 400 is arranged to realize detachable connection between the first frame 100 and the second frame 300. Specifically, the first connecting structure 400 may be a reusable adhesive structure, a suction cup structure, a fixing pin structure, a buckle structure, a zipper structure, a barb 120 structure, a fitted tube pillar structure and other connecting structures. Of course, the first connecting structure 400 is not limited to the above-mentioned structures, and other connecting structures capable of realizing detachable connection between the first frame 100 and the second frame 300 are also applicable to the disclosure.

According the positioning device for radiotherapy in this example, the second frame 300 and the low-temperature thermoplastic film 200 form a degradable whole, the first frame 100 is non-degradable, and the first frame 100 and the second frame 300 are detachably connected. When in use, the first frame 100 is connected to the second frame 300. The first frame 100 has good rigidity and mechanical strength, and thus, can ensure the rigidity and mechanical strength of the overall positioning device for radiotherapy, thereby ensuring the accuracy of positioning of the positioning device for radiotherapy patients. After the positioning device for radiotherapy has been used by the radiotherapy patient, the first frame 100 is detached from the second frame 300. The first frame 100 is reusable, and the second frame 300 and the low-temperature thermoplastic film 200 are non-reusable but degradable, which thereby avoids environmental pollution. Since the second frame 300 and the low-temperature thermoplastic film 200 that are non-reusable are degradable and the non-degradable first frame 100 is reusable, when in use, the positioning device for radiotherapy designed above can have satisfactory rigidity and mechanical strength for positioning, and can effectively avoid waste and environmental pollution. In addition, at present, the film and the frame are typically connected by hot melting, gluing or ultrasonic welding. Since the similarity of properties between the second frame 300 the low-temperature thermoplastic film 200 is higher than that between the first frame 100 and the low-temperature thermoplastic film 200, when the low-temperature thermoplastic film 200 and the frame are connected by hot melting, gluing or ultrasonic welding, the stability of connection between the low-temperature thermoplastic film 200 and the second frame 300 is better than that between the low-temperature thermoplastic film 200 and the first frame 100. When the low-temperature thermoplastic film 200 and the second frame 300 are made of similar materials, the connection between the low-temperature thermoplastic film 200 and the second frame 300 by hot melting, gluing or ultrasonic welding is more stable.

Example II

This example is Example II of a positioning device for radiotherapy according to the disclosure. This example is similar to Example I, except that: in this example, the detachable connection between the first frame 100 and the second frame 300 is realized by a snap-fit. The first connecting structure 400 includes a first snap-fit portion arranged at the first frame 100 and a second snap-fit portion arranged at the second frame 300. The first snap-fit portion is connected to the second snap-fit portion, thereby realizing the detachable connection between the first frame 100 and the second frame 300.

Specifically, in this example, the first snap-fit portion is a snap-fit member 110 rotatably mounted at the first frame 100, and the snap-fit member 110 is provided with a first snap-fit groove 111 into which the first frame 100 and the second frame 300 snap, as shown in FIG. 1. Since the mechanical strength of the first frame 100 is greater than the mechanical strength of the second frame 300, mounting the snap-fit member 110 to the first frame 100 in this example can ensure the stability of mounting and snap-fit of the snap-fit member 110. Specifically, the snap-fit member 110 is rotatably connected to the first frame 100 through a rotating shaft 112. The rotating shaft 112 may be arranged in a position where an axis of the rotating shaft 112 is perpendicular to a plane in which the first frame 100 and the second frame 300 are located, or where the axis of the rotating shaft 112 is parallel to the plane in which the first frame 100 and the second frame 300 are located. When the axis of the rotating shaft 112 is perpendicular to the plane in which the first frame 100 and the second frame 300 are located, the rotating shaft 112 can run through the first frame 100 or run through both the first frame 100 and the second frame 300, a cross section of the snap-fit member 110 is a U-shaped structure, and the snap-fit member 110 rotates about a center line of the rotating shaft 112 as the axis of rotation. When the snap-fit member 110 rotates away from the first frame 100, in order to make the first frame 100 and the second frame 300 detached from the first snap-fit groove 111, in this example, a side of the snap-fit member 110 close to the rotating shaft 112 is provided with an opening 113. With the arrangement of the opening 113, after the snap-fit member 110 rotates away from the first frame 100 and the second frame 300 by a certain angle (for example, 90 degrees), the first frame 100 and the second frame 300 can be detached from the opening 113. When the axis of the rotating shaft 112 is parallel to the plane in which the first frame 100 and the second frame 300 are located, the cross section of the snap-fit member 110 is an L-shaped structure, the snap-fit member 110 is mounted to the first frame 100 through the rotating shaft 112, and when the snap-fit member 110 is turned up or down, the first frame 100 is connected to the second frame 300 or the second frame 300 is separated from the first frame 100.

In addition, the second snap-fit portion is a first recess 310 provided in the second frame 300, and a bottom edge of the snap-fit member 110 snaps into the first recess 310, thereby improving the stability of connection between the first frame 100 and the second frame 300 and realizing rapid positioning of the first frame 100 relative to the second frame 300. In order to prevent the bottom edge of the snap-fit member 110 from projecting from the surface of the second frame 300 and thus affecting the connection between the second frame 300 and the radiotherapy baseplate, a height of the first recess 310 in this example is not less than a height of the bottom edge of the snap-fit member 110. Preferably, in this example, when the bottom edge of the snap-fit member 110 snaps into the first recess 310, a bottom surface of the snap-fit member 110 is flush with a bottom surface of the second frame 300, so that when the positioning device for radiotherapy is in use, the second frame 300 is closely attached to the radiotherapy baseplate, which increases the contact area and contact friction between the second frame 300 and the radiotherapy baseplate, thereby improving the stability of connection between the positioning device and the radiotherapy baseplate.

Example III

Figure 2:
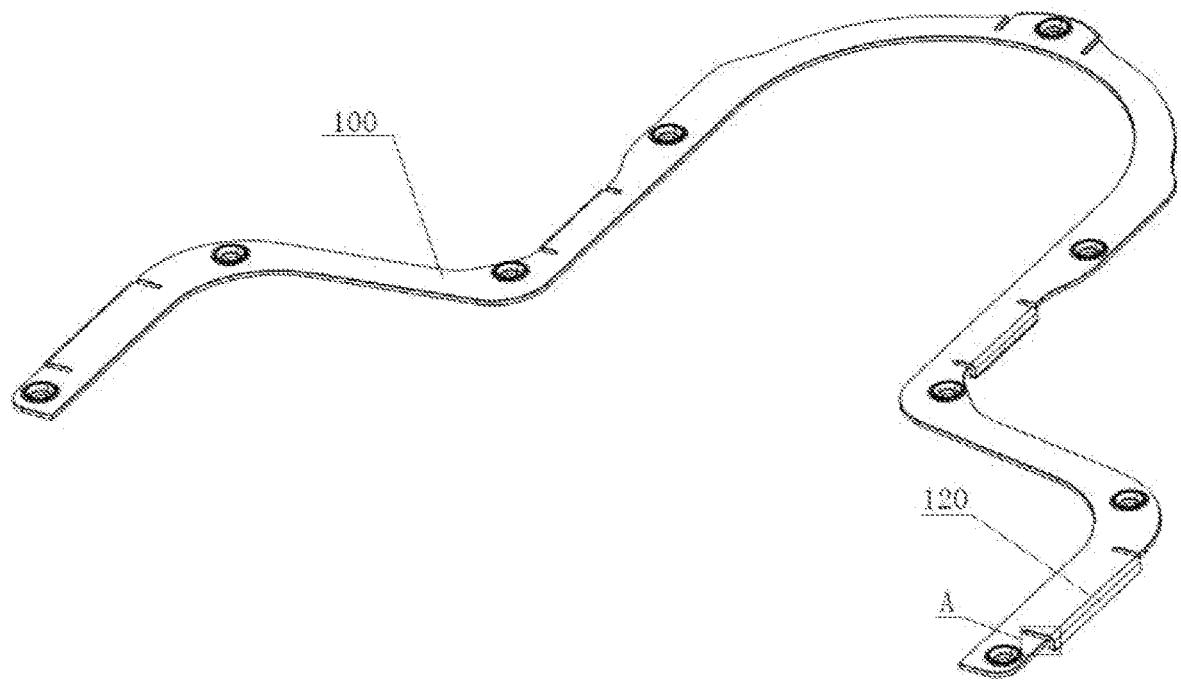
FIG. 2 is a schematic structural view of a first frame of a positioning device for radiotherapy in Example III.

This example is Example III of a positioning device for radiotherapy according to the disclosure. This example is similar to Example II, except that: the first snap-fit portion is a barb 120 formed by turning down the first frame 100 to the second frame 300, and the barb 120 is provided with a second snap-fit groove 121 into which the second frame 300 snaps, as shown in FIG. 2. There are a plurality of barbs 120. The plurality of barbs 120 are evenly distributed on an outer edge of the first frame 100, and a height of the second snap-fit groove 121 is not greater than a thickness of the second frame 300, so that the first frame 100 can snap into the second snap-fit groove 121, thereby ensuring the stability of connection between the first frame 100 and the second frame 300.

Figure 4:
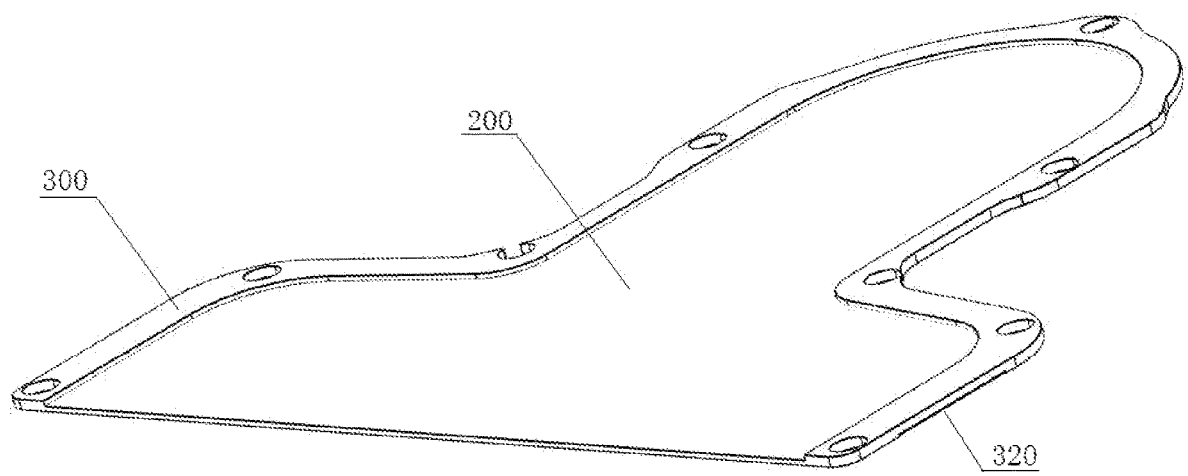
FIG. 4 is a schematic structural view of a second frame of the positioning device for radiotherapy in Example III.

In order to prevent a bottom edge of the barb 120 from projecting from the surface of the second frame 300 and thus affecting the connection between the second frame 300 and the radiotherapy baseplate, the second snap-fit portion in this example is a second recess 320 provided in the second frame 300, and a height of the second recess 320 is not less than a height of the bottom edge of the barb 120, as shown in FIG. 4. Preferably, in this example, when the bottom edge of the barb 120 snaps into the second recess 320, a bottom surface of the barb 120 is flush with a bottom surface of the second frame 300, so that when the positioning device for radiotherapy is in use, the second frame 300 is closely attached to the radiotherapy baseplate, which increases the contact area and contact friction between the second frame 300 and the radiotherapy baseplate, thereby improving the stability of connection between the positioning device and the radiotherapy baseplate.

Figure 3:
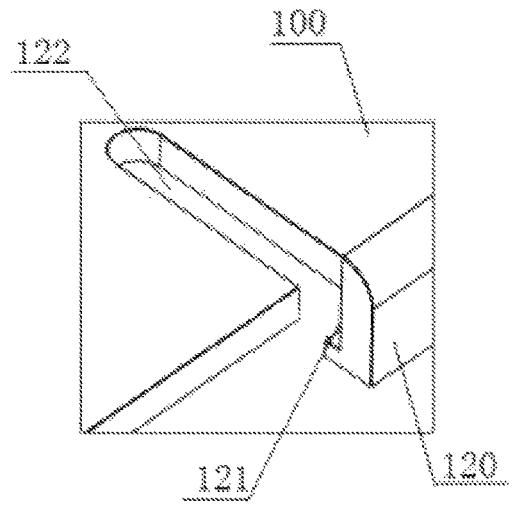
FIG. 3 is an enlarged view of A in FIG. 2.

In addition, the first frame 100 is provided with a plurality of notches 122, and at least one side of the barb 120 is provided with the notch 122. The arrangement of the notch 122 makes the barb 120 easily deformed, which facilitates the connection or separation between the first frame 100 and the second frame 300, as shown in FIG. 3. In order to make the deformation of the barbs 120 uniform, in this example, both sides of the barb 120 are provided with the notches 122, and the notches 122 on the two sides of the barb 120 have the same size and shape.

Embodiment IV

Figure 5:
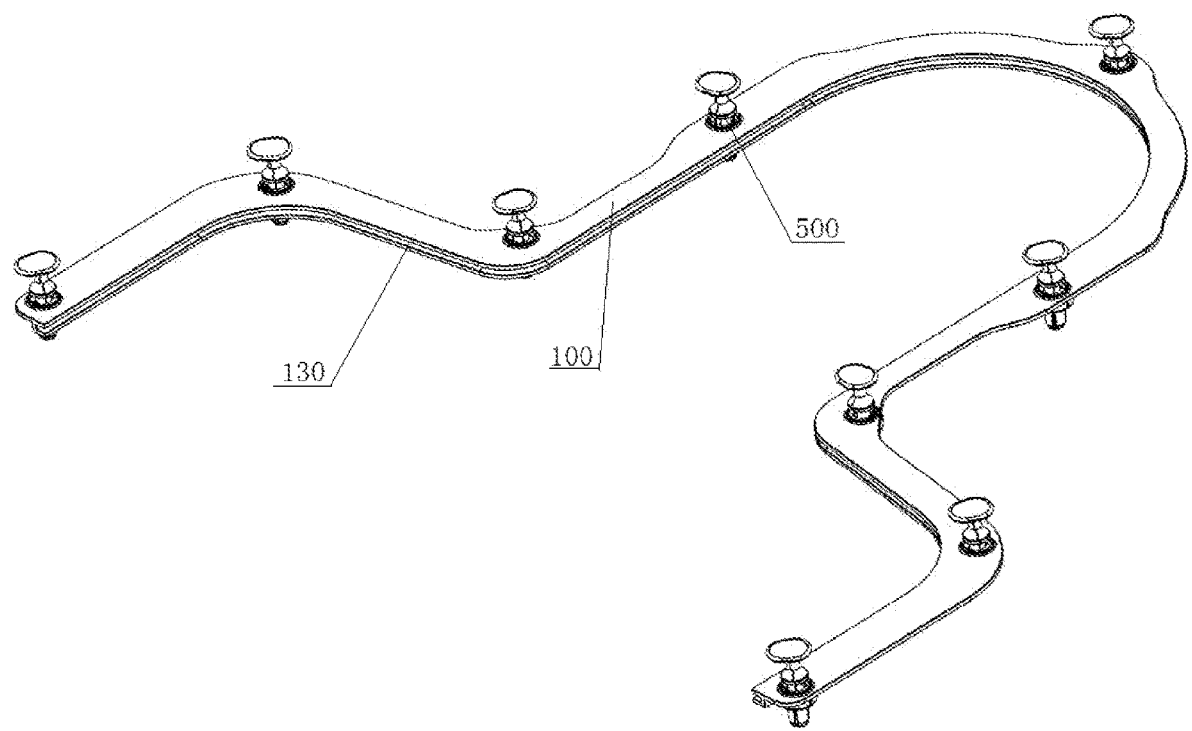
FIG. 5 is a schematic structural view of a positioning device for radiotherapy in Example IV.

This example is Example IV of a positioning device for radiotherapy according to the disclosure. This example is similar to Example II, except that: the first snap-fit portion is a third snap-fit groove 130 provided at an inner edge of the first frame 100 and having a shape matched with that of an outer edge of the second frame 300, and the second frame 300 snaps in along the third snap-fit groove 130 or is inserted into the third snap-fit groove 130, as shown in FIG. 5. Outlines of the first frame 100 and the second frame 300 are basically the same, the shape of the third snap-fit groove 130 arranged at the inner edge of the first frame 100 is matched with that of the outer edge of the second frame 300, and the second frame 300 is inserted from the side of the third snap-fit groove 130 with the opening 113 (having a larger size), thereby realizing the detachable connection between the first frame 100 and the second frame 300. A height of the third snap-fit groove 130 is not greater than a height of the second frame 300. When the height of the third snap-fit groove 130 is less than the height of the second frame 300, the first frame 100 and the second frame 300 are in an interference fit, which can effectively ensure the stability of connection between the first frame 100 and the second frame 300.

Figure 6:
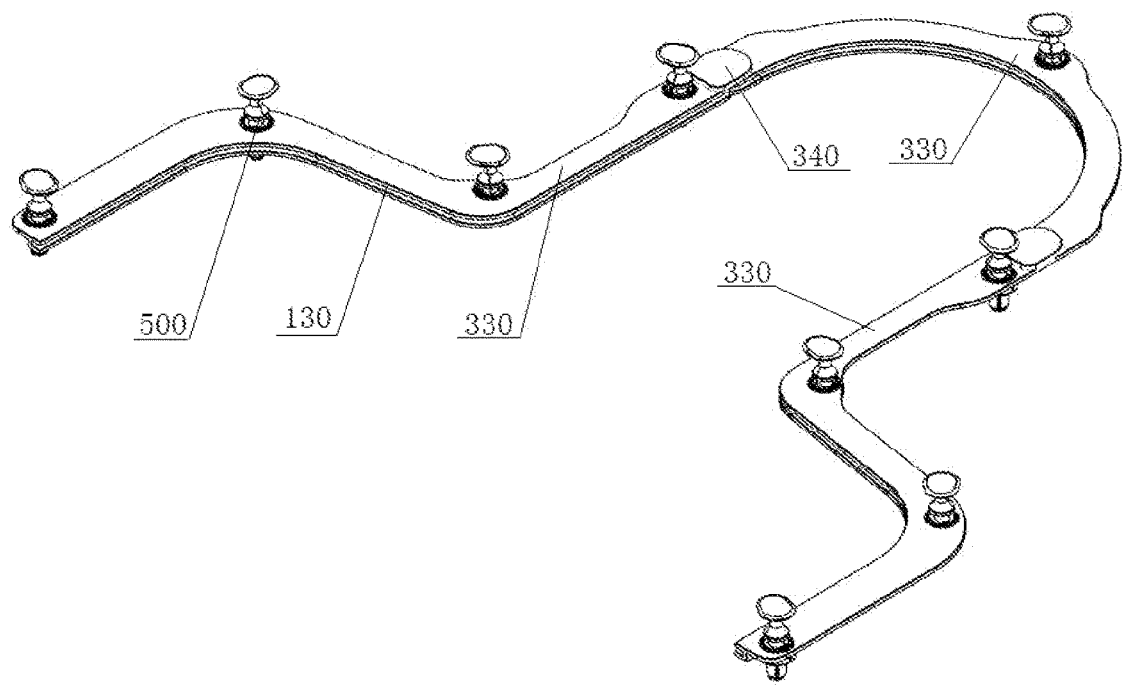
FIG. 6 is a schematic structural view of another positioning device for radiotherapy in Example IV.

In order to simplify the mounting between the first frame 100 and the second frame 300, in this example, as shown in FIG. 6, the first frame 100 includes a plurality of side strips 330 hinged sequentially, and a junction between the adjacent side strips 330 is provided with a rotary joint 340, so that the size of the opening 113 of the first frame 100 into which the second frame 300 is inserted can be adjusted. The size of the opening 113 may be increased first. After the second frame 300 is inserted, the size of the opening 113 is reduced, so that the second frame 300 can snap into the third snap-fit groove 130. In this way, the second frame 300 can be connected to the first frame 100 conveniently. Specifically, when the positioning device of this example is used for positioning a patient's head, neck and shoulders, left and right sides of the first frame 100 are respectively provided with one rotary joint 340, and the rotary joints 340 are located at the head position, or the neck position, or the junctions between the head position and the neck position. The first frame 100 arranged in this way has better structural stability and is less difficult to operate. In addition, it should be noted that in order to realize the stability of the structure after the first frame 100 and the second frame 300 are mounted, when the first frame 100 rotates to a position in which the first frame is fitted with the second frame 300, the rotary joint 340 can maintain relative positions between the first frame 100 and the second frame 300, so as to prevent the low-temperature thermoplastic film 200 from being detached from the first frame 100.

Example V

Figure 7:
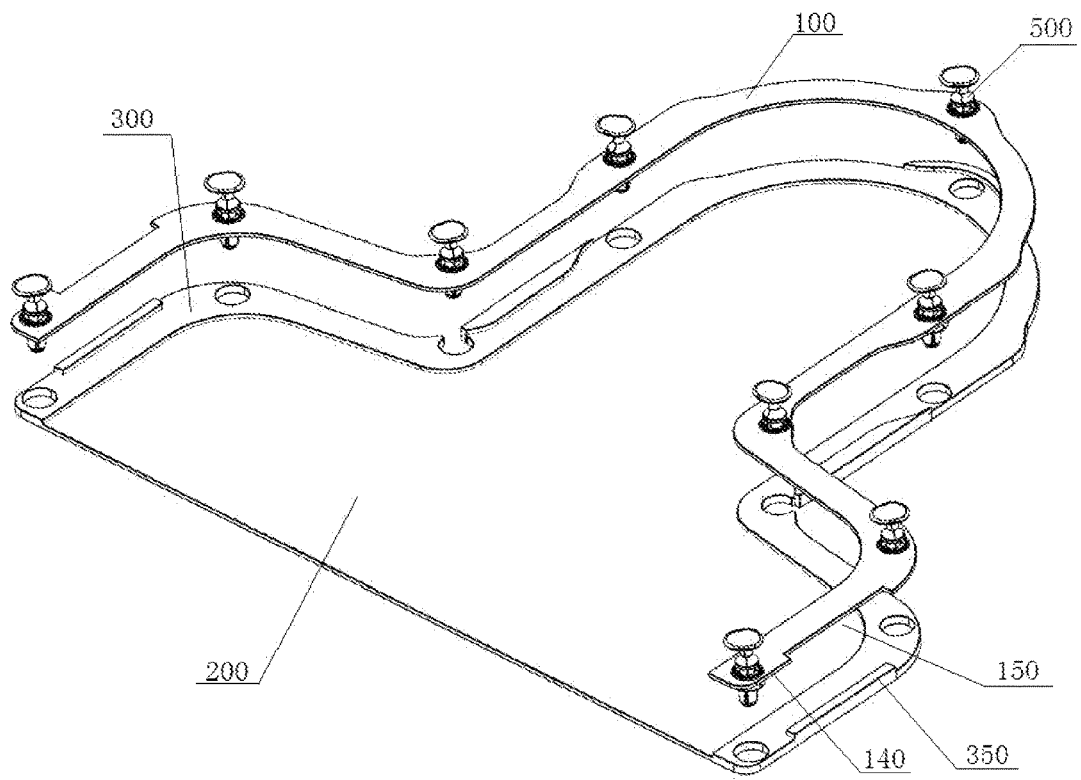
FIG. 7 is a schematic structural view of a positioning device for radiotherapy in Example V.

This example is Example V of a positioning device for radiotherapy according to the disclosure. This example is similar to Example II, except that: the first frame 100 is provided with a plurality of flanges 140 turned down to the second frame 300, the first snap-fit portion is a hollow portion 150 formed by recessing an edge of the first frame 100 between the two adjacent flanges 140, and the second snap-fit portion is a protrusion 350 arranged at the second frame 300 and fitted with the hollow portion 150, as shown in FIG. 7. When in use, an outer edge of the second frame 300 abuts against an inner side surface of the flange 140, and at the same time, the protrusion 350 snaps into the hollow portion 150, thereby completing the connection between the first frame 100 and the second frame 300. In addition, due to the design that the protrusion 350 snaps into the hollow portion 150, a part of the second frame 300 is exposed to the visible surface of the operator, so that the operator can get the low-temperature thermoplastic film 200 at the bottom first, thereby effectively preventing detachment. In this example, the shapes of the protrusion 350 and the hollow portion 150 are designed according to the positions of the protrusion 350 and the hollow portion 150. Specifically, the protrusion 350 may be a rectangular strip structure, an irregular rectangular strip structure, or an arc strip structure.

In order to ensure the flatness of an outer surface of the positioning device for radiotherapy, when the protrusion 350 of this example is arranged in the hollow portion 150, a surface of the protrusion 350 is flush with a surface of the first frame 100, and an edge of the protrusion 350 is flush with edges of the flanges 140 on two sides of the protrusion 350. It should be noted that the flushness above is a preference made to ensure the flatness of the outer surface of the positioning device for radiotherapy, but not a limitation of the disclosure.

Example VI

Figure 8:
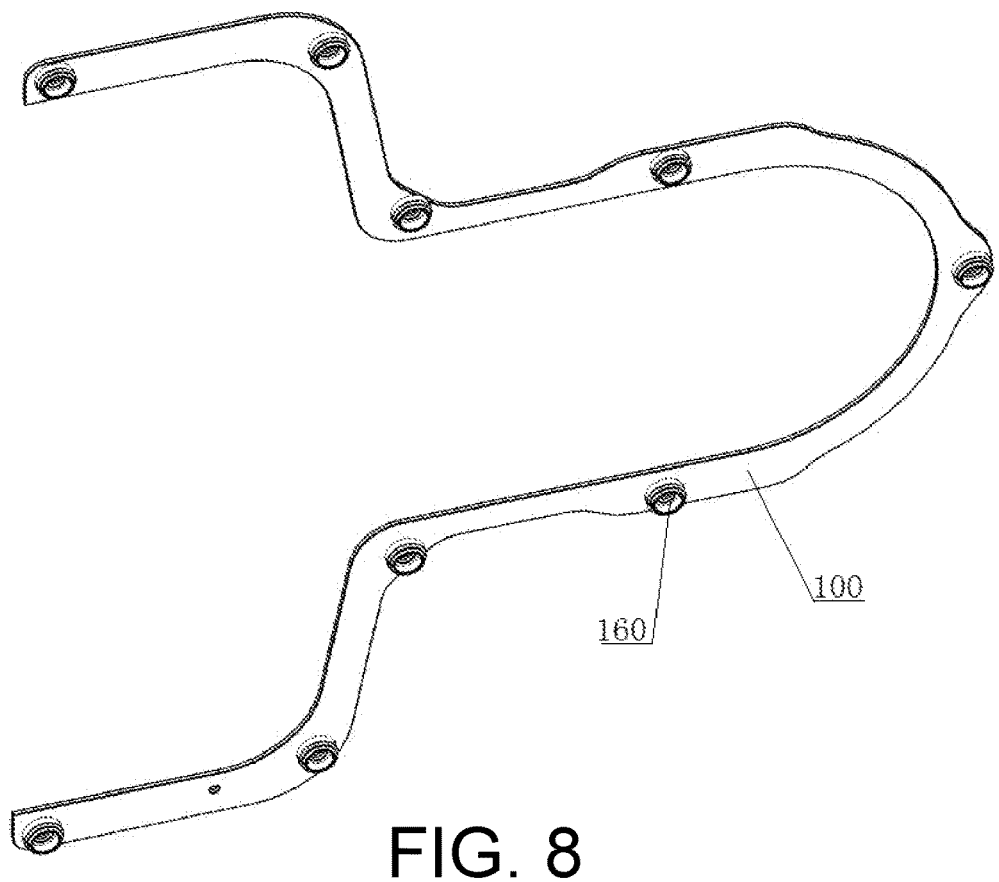
FIG. 8 is a schematic structural view of a first frame of a positioning device for radiotherapy in Example VI.
Figure 9:
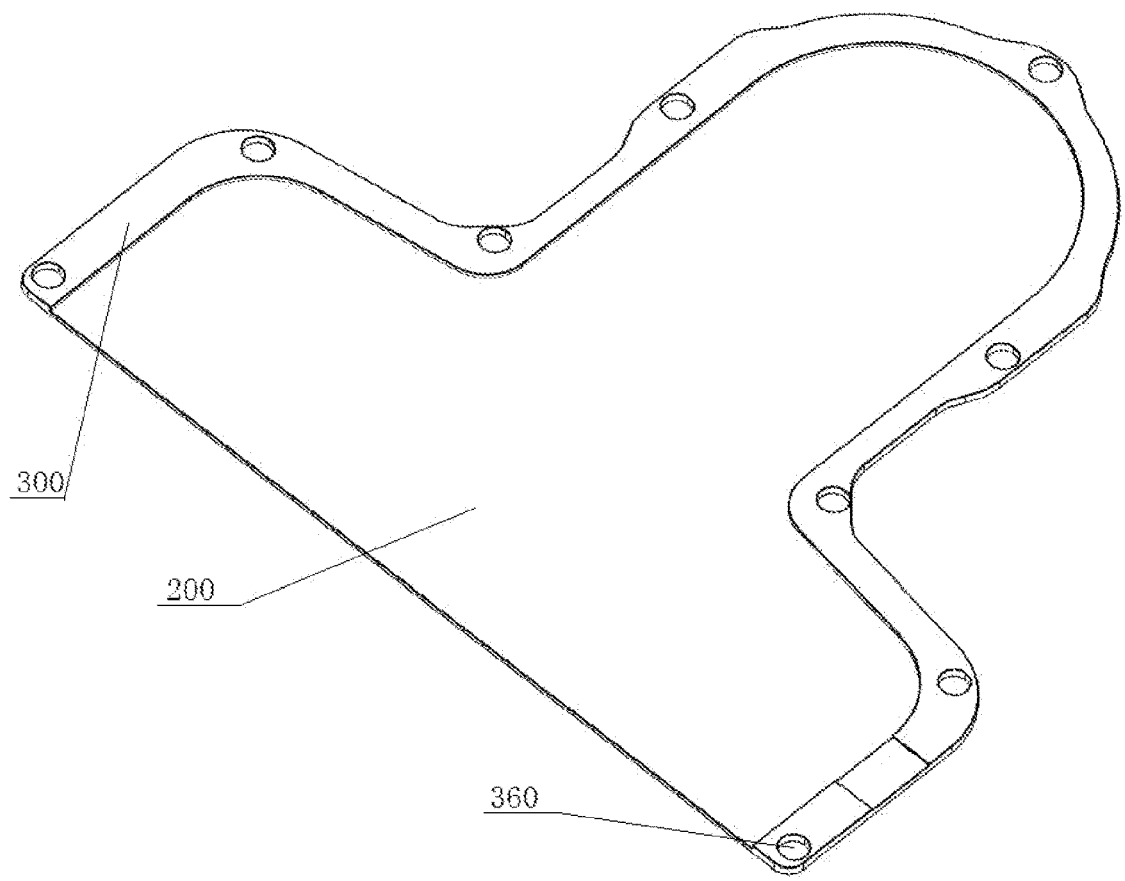
FIG. 9 is a schematic structural view of a second frame of the positioning device for radiotherapy in Example VI.

This example is Example VI of a positioning device for radiotherapy according to the disclosure. This example is similar to Example, except that: the first snap-fit portion is a plurality of abutting members 160 projecting from a bottom surface of the first frame 100, the second snap-fit portion is a plurality of snap-fit holes 360 provided in the second frame 300, and the abutting member 160 snaps into an inner wall of the snap-fit hole 360, as shown in FIG. 8 and FIG. 9. The mechanical strength of the first frame 100 is higher than the mechanical strength of the second frame 300, so the first frame 100 is not easily deformed. In addition, when the user applies a force, it is easier to apply a downward pressure. Therefore, in this example, the abutting member 160 is arranged at the first frame 100 and made of the same material as the first frame 100. Specifically, in this example, the whole abutting member 160 is in the shape of a circular ring, the corresponding snap-fit hole 360 is also circular, and an inner diameter of the snap-fit hole 360 may be designed to be less than an outer diameter of the abutting member 160, so as to ensure the stability of connection between the first frame 100 and the second frame 300. In addition, in order to provide a space for the compressional deformation of the abutting member 160 so as to further ensure the stability of connection between the first frame 100 and the second frame 300, the circular ring-shaped abutting member 160 in this example is formed by connecting a plurality of concentric circular arc members end to end, leaving a gap for deformation between the adjacent circular arc members.

Example VII

This example is Example VII of a positioning device for radiotherapy according to the disclosure. This example is similar to Example I, except that: the first connecting structure 400 includes a first fastening portion arranged at the first frame 100 and a second fastening portion arranged at the second frame 300, and the first fastening portion is fastened to the second fastening portion. In this example, the detachable connection between the first frame 100 and the second frame 300 is realized by fastening.

Specifically, in one embodiment, the first fastening portion and the second fastening portion are fastened directly. The first fastening portion and the second fastening portion may form a press fastener hidden between the first frame 100 and the second frame 300, which can make the appearance of the positioning device neat. When in use, the first fastening portion is pressed toward the second fastening portion, so that the first fastening portion and the second fastening portion are fastened. When the first fastening portion is unfastened in a direction away from the second fastening portion, the first fastening portion and the second fastening portion are separated from each other. Of course, it should be noted that in addition to the press fastener, other forms of male piece serving as the first fastening portion and other forms of female piece serving as the second fastening portion may be fitted with each other to realize the detachable connection between the first fastening portion and the second fastening portion.

Figure 10:
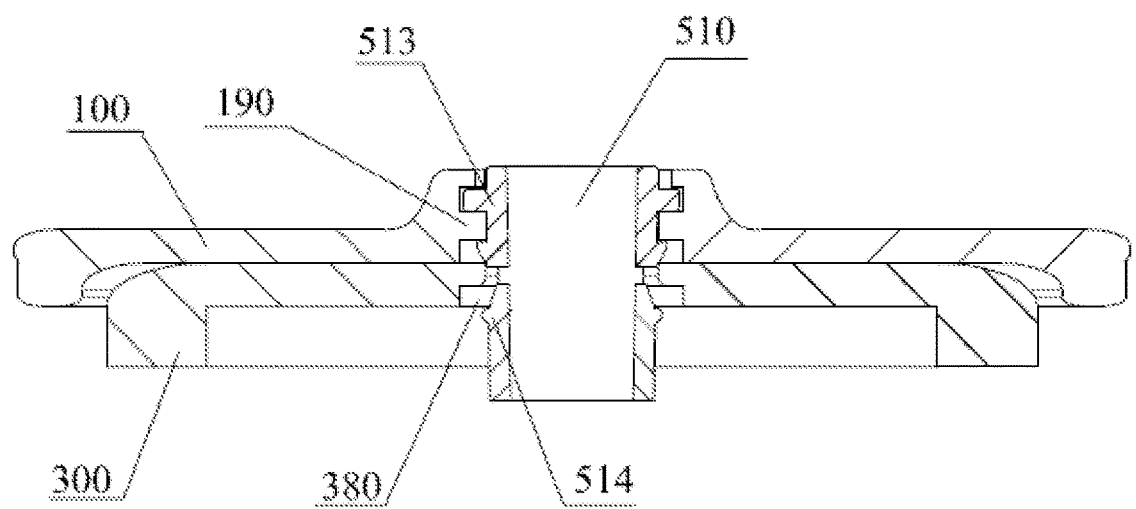
FIG. 10 is a schematic structural view of a positioning device for radiotherapy in Example VII.

In another embodiment, the first fastening portion 190 and the second fastening portion 380 are fastened indirectly. The first fastening portion 190 and the second fastening portion 380 are fastened through a clamping claw 510. Specifically, the clamping claw 510 is provided with a third fastening portion 513 and a fourth fastening portion 514 distributed up and down and respectively corresponding to the first fastening portion 190 and the second fastening portion 380. The first fastening portion 190 and the third fastening portion 513 are fastened to each other, and the second fastening portion 380 and the fourth fastening portion 514 are fastened to each other, so that the first frame 100, the second frame 300 and the clamping claw 510 are fixed, thereby realizing the pre-mounting of the first frame 100 and the second frame 300, as shown in FIG. 10.

Example VIII

Figure 11:
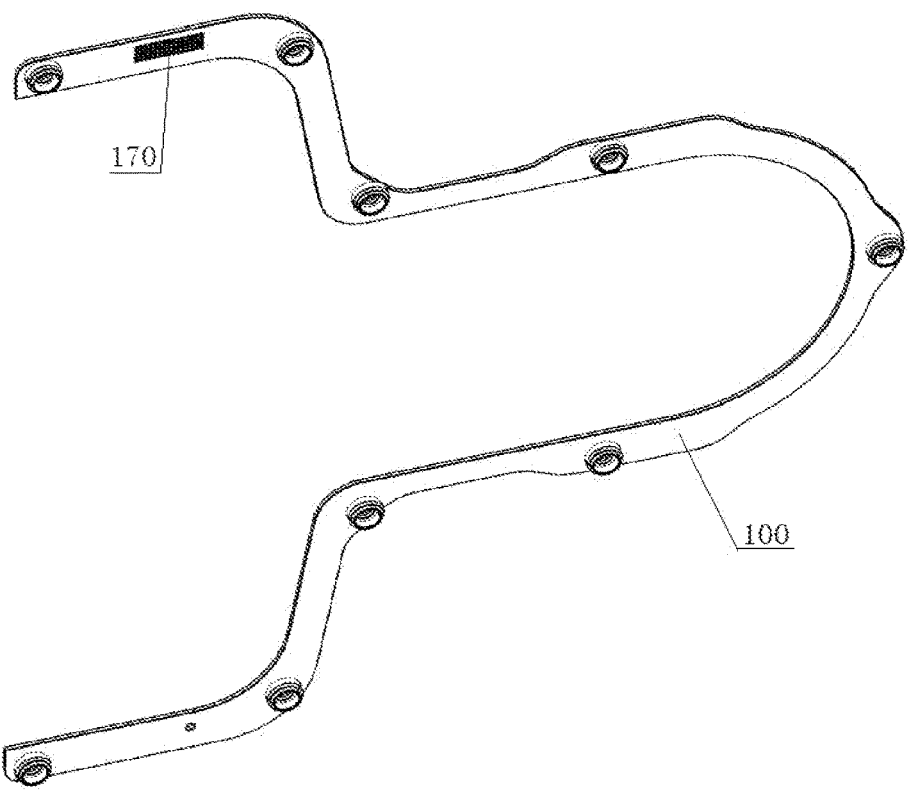
FIG. 11 is a schematic structural view of a first frame of a positioning device for radiotherapy in Example VIII.
Figure 12:
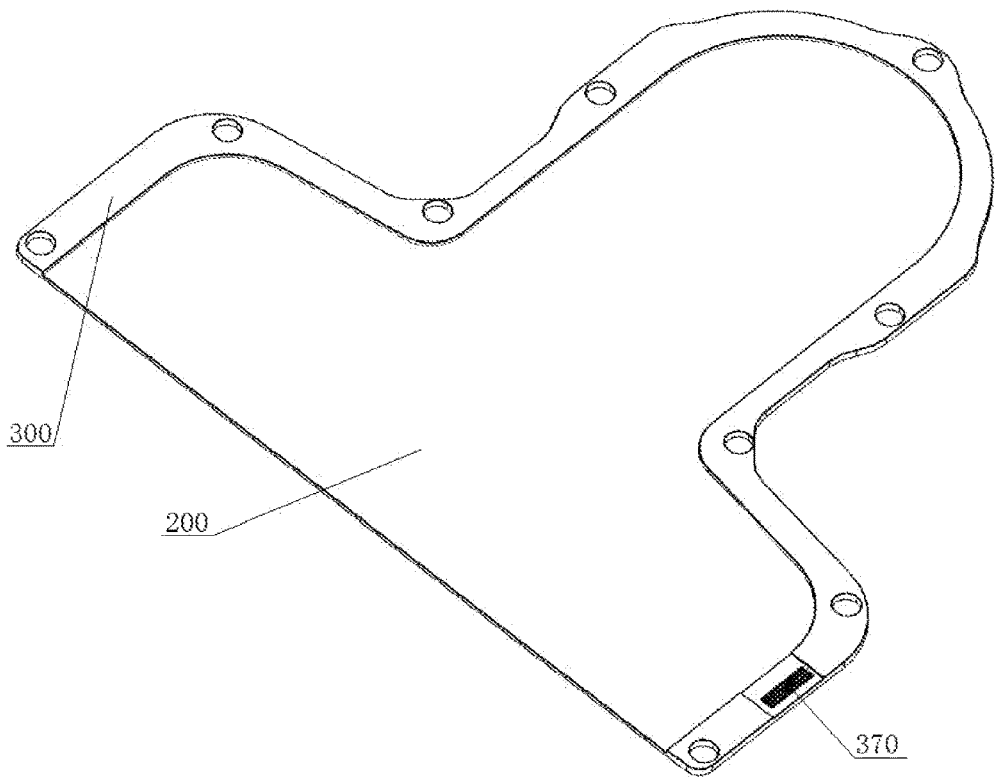
FIG. 12 is a schematic structural view of a second frame of the positioning device for radiotherapy in Example VIII.

This example is Example VIII of a positioning device for radiotherapy according to the disclosure. This example is similar to Example I, except that: a bottom surface of the first frame 100 is provided with a plurality of first barb portions 170, and a top surface of the second frame 300 is provided with a plurality of second barb portions 370; and positions of the first barb portions 170 are in one-to-one correspondence to positions of the plurality of second barb portions 370, and the first barb portion 170 is fitted with the second barb portion 370 to realize detachable connection between the first frame 100 and the second frame 300, as shown in FIG. 11 and FIG. 12. The first barb portion 170 is provided with a plurality of first barbs, and the second barb portion 370 is provided with a plurality of second barbs. The first barb and the second barb are engaged so as to realize the connection and fixation between the first frame 100 and the second frame 300. When the force of separation is greater than the force of engagement between the first barb and the second barb, the first barb and the second barb can be separated. Specifically, in this example, the first barb and the second barb may be conical protrusions 350 or structures of other shapes, which is not specifically limited.

When the first barb portion 170 is fitted with the second barb portion 370, the bottom surface of the first frame 100 is closely attached to the top surface of the second frame 300. In this example, the first frame 100 and the second frame 300 can be closely attached to each other through the structural design of the first barb and the second barb, or the first frame 100 and the second frame 300 can be closely attached to each other by setting a first barb region where the first barb portion 170 is located and/or a second barb region where the second barb portion 370 is located as a recess. In this way, the first frame 100 can fully contact or be attached to the second frame 300, and the contact of the second frame 300 with hot water in the softening process can be reduced, thereby ensuring the structural strength of the second frame 300. In addition, when the first frame 100 and the second frame 300 are closely attached to each other by setting the recess, this can avoid the increase in the overall thickness of the positioning device, reduce the production cost of the positioning device and increase the portability of the positioning device.

Example IX

This example is Example IX of a positioning device for radiotherapy according to the disclosure. This example is similar to Example I, except that: a bottom surface of the first frame 100 and/or a top surface of the second frame 300 are/is provided with a reusable adhesive. Specifically, the reusable adhesive may be arranged at the bottom surface of the first frame 100, or at the top surface of the second frame 300, or at both the bottom surface of the first frame 100 and the top surface of the second frame 300. The reusable adhesive can bond objects, which can be separated under the action of an external force. The reusable adhesive can be used many times. In order to prevent the reusable adhesive from protruding from the surface of the first frame 100 or the second frame 300, in this example, the first frame 100 and/or the second frame 300 may be provided with a mounting groove for mounting the reusable adhesive. In this way, when the first frame 100 and the second frame 300 are connected, the bottom surface of the first frame 100 is closely attached to the top surface of the second frame 300.

Example X

This example is Example X of a positioning device for radiotherapy according to the disclosure. This example is similar to Example I, except that: a bottom surface of the first frame 100 and/or a top surface of the second frame 300 are/is provided with a plurality of evenly distributed suction cups. Specifically, the suction cups may be arranged at the bottom surface of the first frame 100 to adhere to the top surface of the second frame 300, or at the top surface of the second frame 300 to adhere to the bottom surface of the first frame 100, or partially at the bottom surface of the first frame 100 and partially at the top surface of the second frame 300 in a staggered manner. In order to prevent the suction cup from protruding from the surface of the first frame 100 or the second frame 300, in this example, the first frame 100 and/or the second frame 300 may be provided with a mounting groove for mounting the suction cup. In this way, when the first frame 100 and the second frame 300 are connected, the bottom surface of the first frame 100 is closely attached to the top surface of the second frame 300.

Example XI

This example is Example XI of a positioning device for radiotherapy according to the disclosure. This example is similar to Example I, except that: a bottom surface of the first frame 100 and a top surface of the second frame 300 are provided with magnetic members capable of attracting each other. Specifically, both the bottom surface of the first frame 100 and the top surface of the second frame 300 are provided with the magnetic members, and the detachable connection between the first frame 100 and the second frame 300 is realized by magnetic attraction force between the magnetic members. In order to prevent the magnetic member from protruding from the surface of the first frame 100 or the second frame 300, in this example, the first frame 100 and the second frame 300 may be provided with mounting grooves for mounting the magnetic members. In this way, when the first frame 100 and the second frame 300 are connected, the bottom surface of the first frame 100 is closely attached to the top surface of the second frame 300.

Example XII

This example is Example XII of a positioning device for radiotherapy according to the disclosure. This example is similar to Example I, except that: a bottom surface of the first frame 100 and a top surface of the second frame 300 are provided with hook and loop fasteners capable of being bonded to each other. Specifically, both the bottom surface of the first frame 100 and the top surface of the second frame 300 are provided with the hook and loop fasteners, and the detachable connection between the first frame 100 and the second frame 300 is realized by the holding power between the hook and loop fasteners. In order to prevent the hook and loop fasteners from protruding from the surface of the first frame 100 or the second frame 300, in this example, the first frame 100 and the second frame 300 may be provided with mounting grooves for mounting the hook and loop fasteners. In this way, when the first frame 100 and the second frame 300 are connected, the bottom surface of the first frame 100 is closely attached to the top surface of the second frame 300.

Example XIII

This example is Example XIII of a positioning device for radiotherapy according to the disclosure. This example is similar to Example I, except that: the first connecting structure 400 is an insertion latch; the first frame 100 and the second frame 300 are respectively provided with a plurality of connecting holes 180; and the insertion latch locks the first frame 100 and the second frame 300 when being inserted into the connecting hole 180. This example is convenient to operate and has good stability of connection.

Figure 13:
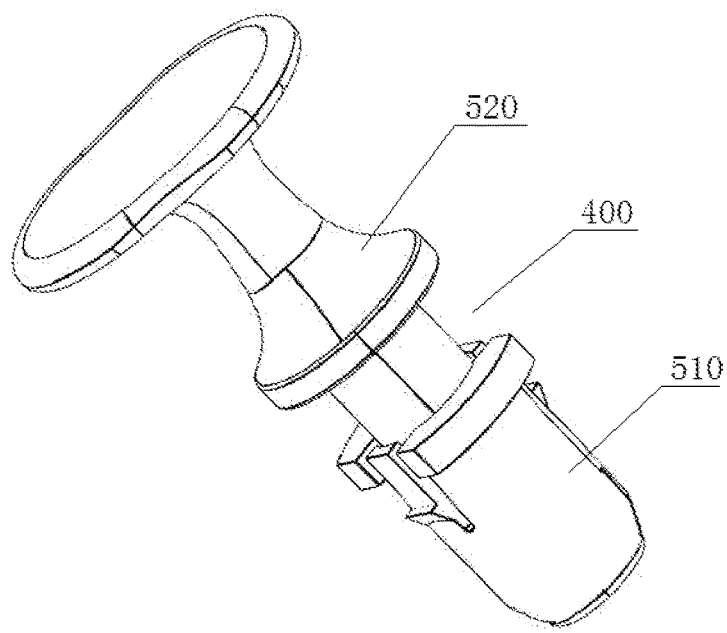
FIG. 13 is a schematic structural view of a first connecting structure in Example XII.

The insertion latch includes a clamping claw 510 and a lockpin 520. The clamping claw 510 is mounted in the connecting hole 180. The lockpin 520 is inserted into an inner side of the clamping claw 510 to outwardly expand the clamping claw 510, and when the lockpin 520 is inserted into the clamping claw 510, the clamping claw 510 expands to lock the first frame 100 against the second frame 300, as shown in FIG. 13. Specifically, the latch has the following working principle: the clamping claw 510 is fixedly mounted in the first frame 100, the clamping claw 510 runs through the connecting holes 180 in the first frame 100 and in the second frame 300, and the lockpin 520 is inserted into the clamping claw 510. A projection is arranged at a periphery of the lockpin 520, so the lockpin 520 can outwardly expand the clamping claw 510 when being pressed down. Thereby, the clamping claw 510 becomes fastened in the connecting hole 180 of the second frame 300, thus completing the connection between the first frame 100 and the second frame 300. Those skilled in the art can understand the structure of the insertion latch in conjunction with the existing lockpin 520-clamping claw 510 assembly, which thereby will not be described in detail in this application.

It should be noted that in the disclosure, the first connecting structure 400 in the disclosure is not limited to the first connecting structure 400 in a single form, and the connection between the first frame 100 and the second frame 300 may also be realized by a combination of any two or more of the connection methods in Example I to Example XII.

Example XIV

This example is Example XIV of a positioning device for radiotherapy according to the disclosure. This example is similar to Example I, except that: in this example, the first frame 100 is detachably connected to a radiotherapy baseplate through a second connecting structure 500. The second connecting structure 500 may be pre-mounted to the first frame 100 and the second frame 300, or pre-mounted to the radiotherapy baseplate. Of course, the second connecting structure 500 may also not be pre-mounted, and only assembled when in use, which is not specifically limited in this example. Of course, compared with the connecting structure that is not pre-mounted, the pre-mounted second connecting structure 500 can reduce the mounting steps and improve the mounting efficiency when in use.

Specifically, in this example, the second frame 300 is mounted between the first frame 100 and the radiotherapy baseplate. When the first frame 100 is detachably connected to the radiotherapy baseplate through the second connecting structure 500, the second connecting structure 500 typically runs through both the first frame 100 and the second frame 300 so as to fix the positioning device to the radiotherapy baseplate. The second frame 300 has a lower structural strength, and the first frame 100 has a higher structural strength. Mounting the first frame 100 onto the second frame 300 can effectively fix the low-temperature thermoplastic film 200 and prevent the second frame 300 from deformation and thus from affecting the accuracy of positioning. In this example, the second connecting structure 500 may have a similar structure to the first connecting structure 400, which may be a snap-fit connecting structure, a fastening type connecting structure or an insertion latch similar to the first connecting structure 400, so as to realize the detachable connection between the first frame 100 and the radiotherapy baseplate. The insertion latch may be a one-segment pin having one locking position, or a two-segment pin having a first locking position and a second locking position distributed up and down.

The first frame 100 and the second frame 300 are connected through the first connecting structure 400, and the first frame 100 and the second frame 300 are connected to the radiotherapy baseplate through the second connecting structure 500. The first connecting structure 400 may be a snap-fit connecting structure, a fastening type connecting structure, an insertion latch or other detachable connecting structure. The second connecting structure 500 may also be a snap-fit connecting structure, a fastening type connecting structure, an insertion latch or other detachable connecting structure. The first connecting structure 400 and the second connecting structure 500 for the positioning device may be different detachable connecting structures. The following describes an example in which there are nine second connecting structures 500. The first connecting structure 400 is a fastening type connecting structure, more specifically a press fastener structure. The first connecting structure 400 may have four connection points that are divided into two groups, each group with two connection points that are symmetrical to each other. One group of connection points are arranged at the head position or the neck position, and the other group of connection points are arranged at the shoulder position. The first frame 100 and the second frame 300 are connected by fastening. The second connecting structure 500 is a one-segment pin type insertion latch. The second connecting structure runs through the connecting holes 180 in the first frame 100 and in the second frame 300, and through the mounting hole in the radiotherapy baseplate, so as to mount the first frame 100 and the second frame 300 to the radiotherapy baseplate. According to this mounting method, the pre-mounting of the first frame 100 and the second frame 300 is realized by the four connection points, which can reduce the time consumed by pre-mounting and effectively avoid the loss of parts caused by scattering of parts. In addition, since the second connecting structure 500 is connected to the radiotherapy baseplate after running through the first frame 100 and the second frame 300, the second connecting structure 500 connects the first frame 100, the second frame 300 and the radiotherapy baseplate, so that the first frame 100, the second frame 300 and the radiotherapy baseplate can be fixed stably and firmly.

Example XV

This example is Example XV of a positioning device for radiotherapy according to the disclosure. This example is similar to Example XIV, except that: the second connecting structure 500 is an insertion latch; the first frame 100 and the second frame 300 are respectively provided with a plurality of connecting holes 180; the radiotherapy baseplate is provided with a plurality of mounting holes; and the insertion latch locks the first frame 100, the second frame 300 and the radiotherapy baseplate when being inserted into the connecting hole 180. The insertion latch includes a clamping claw 510 and a lockpin 520. The clamping claw 510 runs through the connecting hole 180 and is provided with a third expansion claw 515 at a bottom thereof. The lockpin 520 is inserted into an inner side of the clamping claw 510 and provided with a third expansion protrusion 523. The third expansion protrusion 523 squeezes the third expansion claw 515 to outwardly expand the third expansion claw 515, and the third expansion claw 515 expands and becomes fastened in the mounting hole. When the third expansion protrusion 523 moves down to the third expansion claw 515, the third expansion claw 515 expands outwardly and becomes fastened in the mounting hole of the radiotherapy baseplate, thereby realizing the mounting and fixation of the first frame 100, the second frame 300 and the radiotherapy baseplate. When the positioning device needs to be detached, the third expansion protrusion 523 is pulled out from the inner side of the third expansion claw 515 such that the third expansion claw 515 tightens, thereby realizing the separation of the positioning device for radiotherapy from the radiotherapy baseplate.

Figure 14:
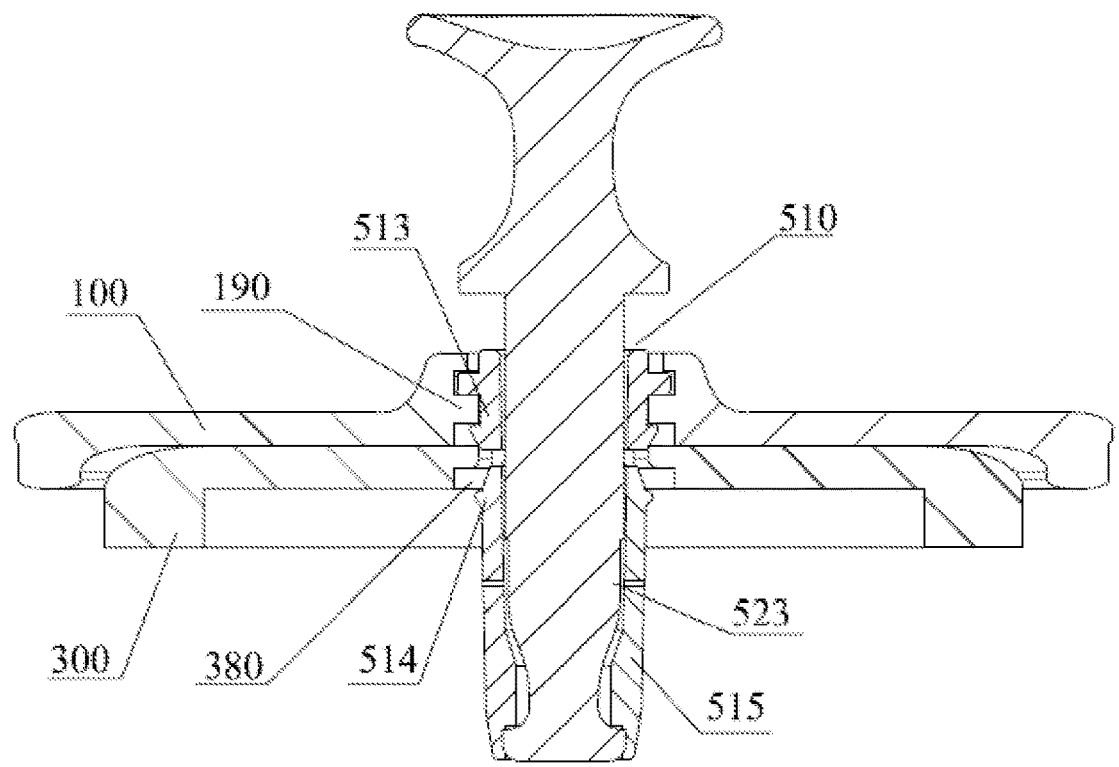
FIG. 14 is a schematic structural view of a positioning device for radiotherapy in Example XIV.

When the first connecting structure 400 is the fastening type connecting structure in Example VII and the second connecting structure 500 is the insertion latch structure in this example, the first connecting structure 400 and the second connecting structure 500 in this example coincide in position and share part of the structures. Specifically, the clamping claw 510 is provided with the third fastening portion 513 and the fourth fastening portion 514 distributed up and down and respectively corresponding to the first fastening portion 190 and the second fastening portion 380. The first fastening portion 190 and the third fastening portion 513 are fastened to each other, and the second fastening portion 380 and the fourth fastening portion 514 are fastened to each other. A bottom of the clamping claw 510 is provided with the third expansion claw 515 capable of expanding outwardly when being squeezed by an external force, a middle of the clamping claw 510 is provided with a through hole through which the lockpin 520 runs, and the lockpin 520 is provided with the third expansion protrusion 523. This design can simplify the structure of the disclosure and reduce the material usage. However, this combination of the first connecting structure and the second connecting structure is not a limitation to the disclosure, as shown in FIG. 14.

Example XVI

Figure 15:
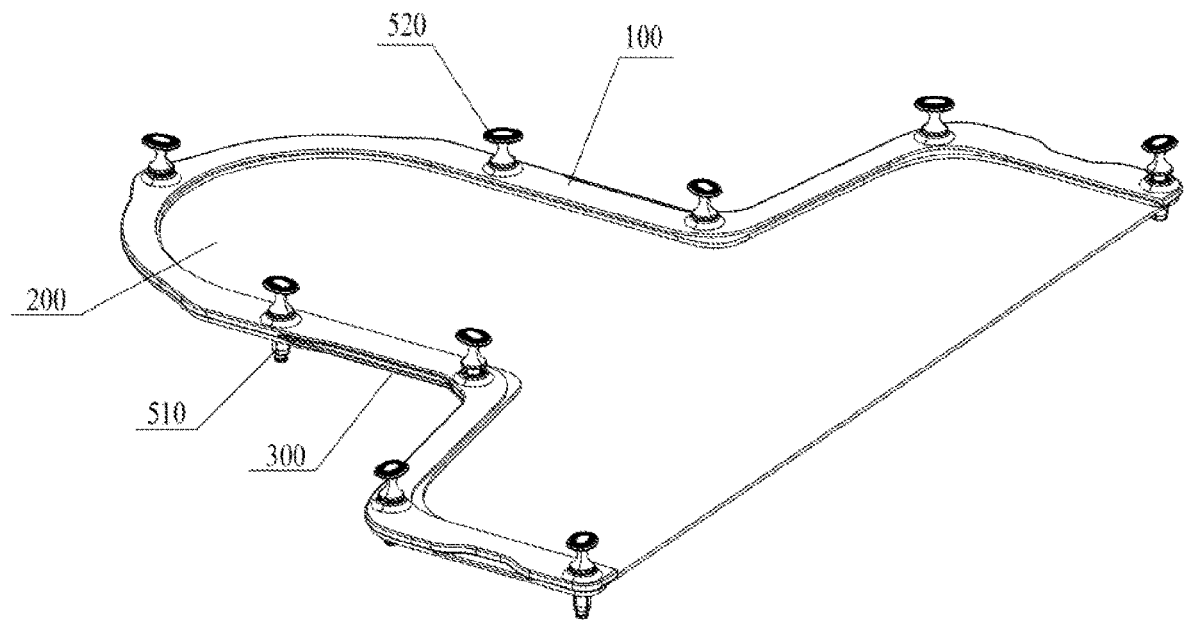
FIG. 15 is a schematic structural view of a positioning device for radiotherapy in Example XV.

This example is Example XVI of a positioning device for radiotherapy according to the disclosure. This example is similar to Example XV, except that: in this example, the first connecting structure 400 and the second connecting structure 500 are both insertion latches, and the first connecting structure 400 and the second connecting structure 500 form one combined insertion latch having a first locking position and a second locking position distributed up and down. When the first connecting structure and the second connecting structure are in the first locking position, the first frame 100 and the second frame 300 are locked. When the first connecting structure and the second connecting structure are in the second locking position, the first frame 100, the second frame 300 and the radiotherapy baseplate are locked, as shown in FIG. 15.

During the implementation of the example, when the first connecting structure and the second connecting structure are in the first locking position, the first frame 100 and the second frame 300 are locked, and at the same time, the combined insertion latch snaps into the connecting holes 180 of the first frame 100 and the second frame 300. The first frame 100, the second frame 300, the low-temperature thermoplastic film and the combined insertion latch are connected into a whole product to be sold and mounted, which can effectively avoid scattering of parts. This pre-mounting can also reduce the time required for alignment and mounting of the positioning device. A bottom of the combined insertion latch projects from a bottom of the second frame 300. When in use, the part projecting from the bottom of the combined insertion latch is inserted into the mounting hole of the radiotherapy baseplate first to realize the positioning of the first frame 100, the second frame 300 and the radiotherapy baseplate, and then the combined insertion latch is pressed down to the second locking position to lock the first frame 100, the second frame 300 and the radiotherapy baseplate in the second locking position, thereby completing the mounting of the positioning device for radiotherapy and the radiotherapy baseplate. Therefore, in this example, the pre-mounting of the first frame 100, the second frame 300 and the combined insertion latch can avoid the loss of parts and reduce the time for mounting the positioning device.

Figure 16:
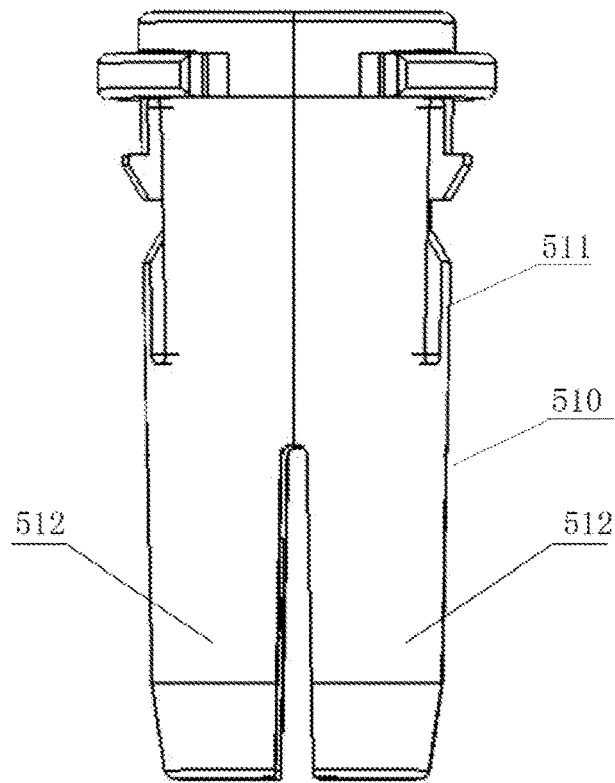
FIG. 16 is a schematic structural view of a clamping claw in Example XV.
Figure 17:
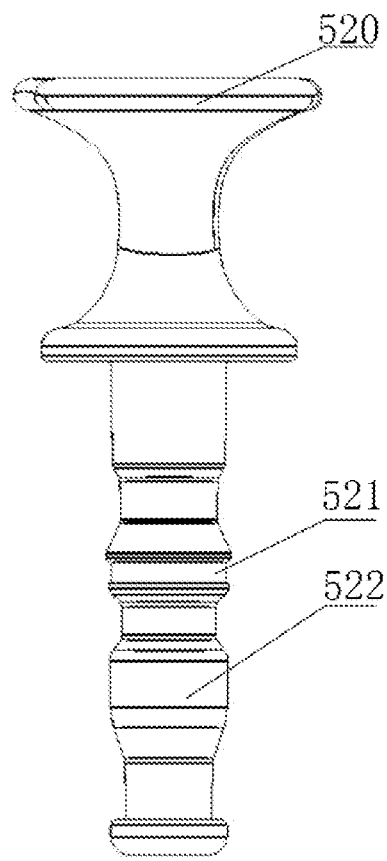
FIG. 17 is a schematic structural view of a pin in Example XV.

Specifically, the combined insertion latch includes a clamping claw 510 and a lockpin 520. The clamping claw 510 is provided with a first expansion claw 511 and a second expansion claw 512, as shown in FIG. 16. The lockpin 520 is provided with a first expansion protrusion 521 and a second expansion protrusion 522, as shown in FIG. 17. When the lockpin 520 is pressed down, the first expansion claw 511 is squeezed by the first expansion protrusion 521 to expand outwardly along a radial direction of the clamping claw 510 so as to fix the first frame 100 and the second frame 300. When the lockpin 520 is pressed down further, the second expansion claw 512 is squeezed by the second expansion protrusion 522 to expand outwardly along the radial direction of the clamping claw 510 so as to fix the first frame 100, the second frame 300 and the radiotherapy baseplate. At this time, the first expansion claw 511 may be squeezed by the first expansion protrusion 521 to expand outwardly along the radial direction of the clamping claw 510 so as to fix the first frame 100 and the second frame 300; or the first expansion claw 511 may not be squeezed by the first expansion protrusion 521 nor expand, but the first frame 100 and the second frame 300 are unlocked, and the second frame 300 is squeezed between the first frame 100 and the radiotherapy baseplate so as to realize fixation and locking. The first expansion claw 511 and the second expansion claw 512 are distributed up and down. Accordingly, the first expansion protrusion 521 and the second expansion protrusion 522 are distributed up and down and respectively correspond to the first expansion claw 511 and the second expansion claw 512 in position. When the first expansion protrusion 521, the second expansion protrusion 522 or any expansion protrusion 350 moves to the corresponding position of the first expansion claw 511 and the second expansion claw 512, the first expansion claw 511 and the second expansion claw 512 can be squeezed to expand. When the first expansion protrusion 521 is pressed down to the first expansion claw 511, the first expansion claw 511 expands and becomes fastened in the connecting hole 180 of the second frame 300 to realize the mounting of the first frame 100 and the second frame 300. When the second expansion protrusion 522 is further pressed down to the second expansion claw 512, the second expansion claw 512 is squeezed by the second expansion protrusion 522 to expand and become fastened in the mounting hole of the radiotherapy baseplate, so that the positioning device is firmly mounted to the radiotherapy baseplate. After use, first, the lockpin 520 is pulled up outward, so that the second expansion protrusion 522 is moved from the second expansion claw 512 to the first expansion claw 511 and the first expansion protrusion 521 is moved out of the first expansion claw 511. At this time, the first frame 100 and the second frame 300 are separated from the radiotherapy baseplate as a whole. Then, the lockpin 520 is further pulled up outward, so that the second expansion protrusion 522 is moved out of the first expansion claw 511. At this time, the first frame 100, the second frame 300 and the lockpin 520 are separated. It should be noted that the combined insertion latch of this example is not limited to the specific structure described above, other insertion latches that realize double locking by pressing twice can also be applied to the disclosure.

In addition, in this example, there may be nine insertion latches, which are evenly distributed along the first frame 100 to stably fix the first frame 100 and the second frame 300 together. When there are nine insertion latches, to realize the pre-mounting, nine operations are needed to lock the first frame 100 and the second frame 300; and to mount the first frame and the second frame to the radiotherapy baseplate, another nine operations are needed to press the insertion latches into the mounting holes of the radiotherapy baseplate, totaling 18 operations for the pre-mounting and mounting processes.

Example XVII

This example is Example XVII of a positioning device for radiotherapy according to the disclosure. This example is similar to Example XVI, except that: in this example, the number of the two-segment pin type insertion latches is less than nine. The number of two-segment pins is reduced, thereby reducing the operating time of the technician. Specifically, in this example, any one or two of the connection methods including snap-fit, fastening and one-segment pin type insertion latch in the above examples may be combined with the two-segment pin type insertion latch in Example XVI, thereby realizing the pre-mounting of the first frame 100, the second frame 300 and the low-temperature thermoplastic film 200, avoiding the loss of parts caused by scattering, and reducing the operating time for mounting the positioning device to the radiotherapy baseplate. For the arrangement of the nine connection points, for example, a combination of one-segment pin type insertion latches and two-segment pin type insertion latches may be used, specifically:

For four of the connection points, four two-segment pin type insertion latches are arranged. The four two-segment pin type insertion latches are divided into two groups, each group with two insertion latches that are symmetrical to each other. The two groups are respectively arranged at the head position or neck position and the shoulder position of the first frame 100 and the second frame 300. The two insertion latches at the shoulder position are located at the bottom of the first frame 100 and the second frame 300. For the other five connection points, the one-segment pin type insertion latches are used. The one-segment pin type insertion latches connect and lock the first frame 100 and the second frame 300. The two-segment pin type insertion latches can connect and lock not only the first frame 100 and the second frame 300, but also the first frame 100, the second frame 300 and the radiotherapy baseplate. The pre-mounting of the first frame 100 and the second frame 300 does not need the technician's operation. The technician only needs to press the four two-segment pin type insertion latches to lock and mount the first frame 100, the second frame 300 and the radiotherapy baseplate, which is simple to operate and can save the operating time of the technician. In this way, the positioning device can be stably connected to the radiotherapy baseplate. Of course, this example is not limited to the connection methods listed above, and other combined connection methods that can reduce the number of two-segment pins can be applied to the disclosure.

Example XVIII

This example is Example XVIII of a positioning device for radiotherapy according to the disclosure. This example is similar to any of Example I to Example XVII, except that: a bottom of the first frame 100 is provided with a positioning protrusion, a top of the second frame 300 is provided with a positioning depression, and the positioning protrusion is fitted with the positioning depression to realize positioning; or the bottom of the first frame 100 is provided with a positioning depression, the top of the second frame 300 is provided with a positioning protrusion, and the positioning protrusion is fitted with the positioning depression to realize positioning. The positioning protrusion is fitted with the positioning depression to realize preliminary positioning between the first frame 100 and the second frame 300, which facilitates the rapid mounting between the first frame 100 and the second frame 300. For Example XIII and Example XV, the connecting hole 180 of the second frame 300 may be used as the positioning depression in this example, and the part of the clamping claw 510 connected to the first frame 100 that projects from the first frame 100 can be used as the positioning protrusion in this example, so that the rapid positioning between the first frame 100 and the second frame 300 can be realized based on the existing structure.

In the specific contents of the above specific embodiments, all technical features can be combined in case of no contradiction. For the sake of concise description, not all possible combinations of the technical features are described. However, as long as there is no contradiction in the combination of these technical features, it should be considered as falling within the scope recorded in this specification.

Apparently, the above examples of the disclosure are only examples for clearly explaining the disclosure, and are not limitations to the embodiments of the disclosure. For those of ordinary skill in the art, other variations or modifications in different forms can be made based on the above description. There is no need and no way to exhaust all of the embodiments here. Any modification, equivalent substitution, or improvement made within the spirit and principle of the disclosure shall fall into the protection scope of the claims of the disclosure.

What is claimed is:

1. A positioning device for radiotherapy, comprising a first frame, a degradable low-temperature thermoplastic film and a degradable second frame, wherein the second frame is connected to an outer edge of the low-temperature thermoplastic film, and a softening point of the second frame is higher than a softening point of the low-temperature thermoplastic film; and a mechanical strength of the first frame is greater than a mechanical strength of the second frame, and the first frame and the second frame are detachably connected through a first connecting structure.

2. The positioning device for radiotherapy according to claim 1, wherein the first connecting structure comprises a first snap-fit portion arranged at the first frame and a second snap-fit portion arranged at the second frame, the first snap-fit portion is connected to the second snap-fit portion.

3. The positioning device for radiotherapy according to according to claim 2, wherein the first snap-fit portion is a snap-fit member rotatably mounted at the first frame, and the snap-fit member is provided with a first snap-fit groove into which the first frame and the second frame snap.

4. The positioning device for radiotherapy according to claim 3, wherein the second snap-fit portion is a first recess provided in the second frame, and a bottom edge of the snap-fit member snaps into the first recess.

5. The positioning device for radiotherapy according to claim 4, wherein when the bottom edge of the snap-fit member snaps into the first recess, a bottom surface of the snap-fit member is flush with a bottom surface of the second frame.

6. The positioning device for radiotherapy according to according to claim 2, wherein the first snap-fit portion is a barb formed by turning down the first frame to the second frame, and the barb is provided with a second snap-fit groove into which the second frame snaps.

7. The positioning device for radiotherapy according to according to claim 6, wherein the second snap-fit portion is a second recess provided in the second frame, and a bottom edge of the barb snaps into the second recess.

8. The positioning device for radiotherapy according to claim 7, wherein when the bottom edge of the barb snaps into the second recess, a bottom surface of the barb is flush with a bottom surface of the second frame.

9. The positioning device for radiotherapy according to according to claim 6, wherein the first frame is provided with a plurality of notches, and at least one side of the barb is provided with the notch.

10. The positioning device for radiotherapy according to according to claim 2, wherein the first snap-fit portion is a third snap-fit groove provided at an inner edge of the first frame and having a shape matched with that of an outer edge of the second frame, and the second frame snaps in along the third snap-fit groove or is inserted into the third snap-fit groove.

11. The positioning device for radiotherapy according to according to claim 10, wherein the first frame comprises a plurality of side strips hinged sequentially, and a junction between the adjacent side strips is provided with a rotary joint.

12. The positioning device for radiotherapy according to according to claim 2, wherein the first frame is provided with a plurality of flanges turned down to the second frame, the first snap-fit portion is a hollow portion formed by recessing an edge of the first frame between two adjacent flanges of the flanges, and the second snap-fit portion is a protrusion (350) arranged at the second frame and fitted with the hollow portion.

13. The positioning device for radiotherapy according to according to claim 12, wherein when the protrusion is arranged in the hollow portion, a surface of the protrusion is flush with a surface of the first frame, and an edge of the protrusion is flush with edges of the flanges on two sides of the protrusion.

14. The positioning device for radiotherapy according to according to claim 2, wherein the first snap-fit portion is a plurality of abutting members projecting from a bottom surface of the first frame, and the second snap-fit portion is a plurality of snap-fit holes provided in the second frame, the abutting member snaps into an inner wall of the snap-fit hole.

15. The positioning device for radiotherapy according to claim 1, wherein the first connecting structure comprises a first fastening portion arranged at the first frame and a second fastening portion arranged at the second frame, the first fastening portion is fastened to the second fastening portion.

16. The positioning device for radiotherapy according to claim 15, wherein the first fastening portion is fastened to the second fastening portion through a clamping claw, and the clamping claw is provided with a third fastening portion and a fourth fastening portion distributed up and down, the first fastening portion is fastened to the third fastening portion, and the second fastening portion is fastened to the fourth fastening portion.

17. The positioning device for radiotherapy according to claim 1, wherein a bottom surface of the first frame is provided with a plurality of first barb portions, and a top surface of the second frame is provided with a plurality of second barb portions, positions of the first barb portions is in one-to-one correspondence to positions of the plurality of second barb portions, and the first barb portion is fitted with the second barb portion to form detachable connection between the first frame and the second frame.

18. The positioning device for radiotherapy according to claim 17, wherein when the first barb portion is fitted with the second barb portion, the bottom surface of the first frame is closely attached to the top surface of the second frame.

19. The positioning device for radiotherapy according to claim 1, wherein a bottom surface of the first frame and/or a top surface of the second frame are/is provided with a reusable adhesive.

20. The positioning device for radiotherapy according to claim 1, wherein a bottom surface of the first frame and/or a top surface of the second frame are/is provided with a plurality of evenly distributed suction cups.

21. The positioning device for radiotherapy according to claim 1, wherein a bottom surface of the first frame and a top surface of the second frame are provided with magnetic members capable of attracting each other.

22. The positioning device for radiotherapy according to claim 1, wherein a bottom surface of the first frame and a top surface of the second frame are provided with hook and loop fasteners capable of being bonded to each other.

23. The positioning device for radiotherapy according to claim 1, wherein the first connecting structure is an insertion latch, the first frame and the second frame are respectively provided with a plurality of connecting holes, and the insertion latch locks the first frame and the second frame when the insertion latch is inserted into the connecting hole.

24. The positioning device for radiotherapy according to claim 23, wherein the insertion latch comprises a clamping claw and a lockpin, the clamping claw is mounted in the connecting hole, the lockpin is inserted into an inner side of the clamping claw to outwardly expand the clamping claw, and when the lockpin is inserted into the clamping claw, the clamping claw expands to lock the first frame against the second frame.

25. The positioning device for radiotherapy according to claim 1, wherein the first frame is detachably connected to a radiotherapy baseplate through a second connecting structure.

26. The positioning device for radiotherapy according to claim 25, wherein the second connecting structure is an insertion latch, the first frame and the second frame are respectively provided with a plurality of connecting holes, the radiotherapy baseplate is provided with a plurality of mounting holes, and the insertion latch locks the first frame, the second frame and the radiotherapy baseplate when the insertion latch is inserted into the connecting hole.

27. The positioning device for radiotherapy according to claim 26, wherein the insertion latch comprises a clamping claw and a lockpin, the clamping claw runs through the connecting hole and is provided with a third expansion claw at a bottom thereof, the lockpin is inserted into an inner side of the clamping claw and provided with a third expansion protrusion, the third expansion protrusion squeezes the third expansion claw to outwardly expand the third expansion claw, and the third expansion claw expands and becomes fastened in the mounting hole.

28. The positioning device for radiotherapy according to claim 26, wherein when the first connecting structure is also an insertion latch, the first connecting structure and the second connecting structure form one combined insertion latch having a first locking position and a second locking position distributed up and down; when the first connecting structure and the second connecting structure are in the first locking position, the first frame and the second frame are locked; and when the first connecting structure and the second connecting structure are in the second locking position, the first frame, the second frame and the radiotherapy baseplate are locked.

29. The positioning device for radiotherapy according to claim 28, wherein the combined insertion latch comprises a clamping claw and a lockpin, the clamping claw is provided with a first expansion claw and a second expansion claw, and the lockpin is provided with a first expansion protrusion and a second expansion protrusion; when the lockpin is pressed down, the first expansion claw is squeezed by the first expansion protrusion to expand outwardly along a radial direction of the clamping claw so as to fix the first frame and the second frame; and when the lockpin is pressed down further, the second expansion claw is squeezed by the second expansion protrusion to expand outwardly along the radial direction of the clamping claw so as to fix the first frame, the second frame and the radiotherapy baseplate.

30. The positioning device for radiotherapy according to claim 1, wherein a bottom of the first frame is provided with a positioning protrusion, a top of the second frame is provided with a positioning depression, and the positioning protrusion is fitted with the positioning depression for positioning; or the bottom of the first frame is provided with a positioning depression, the top of the second frame is provided with a positioning protrusion, and the positioning protrusion is fitted with the positioning depression for positioning.

* * * * *